(12) United States Patent
Xia

(10) Patent No.: US 10,374,892 B2
(45) Date of Patent: Aug. 6, 2019

(54) TRANSFERRING CONTROL METHOD AND APPARATUS, AND TRANSFERRING CONFIGURATION METHOD AND APPARATUS

(71) Applicant: Lenovo (Beijing) Co., Ltd., Beijing (CN)

(72) Inventor: Yan Xia, Beijing (CN)

(73) Assignee: LENOVO (BEIJING) CO., LTD., Haidian District, Beijing (CN)

(*) Notice: Subject to any disclaimer, the term of this patent is extended or adjusted under 35 U.S.C. 154(b) by 340 days.

(21) Appl. No.: 14/788,163

(22) Filed: Jun. 30, 2015

(65) Prior Publication Data

US 2016/0294624 A1    Oct. 6, 2016

(30) Foreign Application Priority Data

Mar. 31, 2015  (CN) .......................... 2015 1 0147887

(51) Int. Cl.
| | |
|---|---|
| *H04L 12/24* | (2006.01) |
| *H04W 4/16* | (2009.01) |
| *H04L 12/58* | (2006.01) |

(52) U.S. Cl.
CPC .......... *H04L 41/0846* (2013.01); *H04W 4/16* (2013.01); *H04L 51/14* (2013.01)

(58) Field of Classification Search
CPC ....... H04L 41/0846; H04L 51/14; H04W 4/16
USPC ........................................................ 709/220
See application file for complete search history.

(56) References Cited

U.S. PATENT DOCUMENTS

| | | | | |
|---|---|---|---|---|
| 2008/0222293 A1* | 9/2008 | Cui | .................... | H04L 29/12047 709/227 |
| 2009/0143051 A1* | 6/2009 | Kim | ...................... | G06Q 10/10 455/414.2 |
| 2012/0158904 A1* | 6/2012 | He | ...................... | G06F 17/3089 709/217 |
| 2013/0041959 A1* | 2/2013 | Bengtsson | .......... | H04L 67/1095 709/206 |

(Continued)

FOREIGN PATENT DOCUMENTS

| | | |
|---|---|---|
| CN | 102638624 A | 8/2012 |
| CN | 102970660 A | 3/2013 |
| CN | 104363360 A | 2/2015 |

OTHER PUBLICATIONS

First Office Action dated Jun. 21, 2018 (23 pages including English translation) from Chinese priority Application 201510147887.1.

(Continued)

*Primary Examiner* — Tauqir Hussain
(74) *Attorney, Agent, or Firm* — Brinks Gilson & Lione; John C. Freeman

(57) ABSTRACT

A transferring control method and apparatus, and a transferring configuration method and apparatus are described. The transferring control method includes connecting to a server by a predetermined account; sending to the server a transferring request for requesting the server to perform transferring configuration, wherein the transferring configuration sets a message transferring relationship among a plurality of electronic devices connected to the server by the predetermined account, and the plurality of electronic devices comprise the first electronic device and at least one second electronic device.

14 Claims, 7 Drawing Sheets

(56) References Cited

U.S. PATENT DOCUMENTS

| 2014/0282086 A1* | 9/2014 | Shi ........................ H04L 51/046 |
| | | 715/752 |
| 2014/0282888 A1* | 9/2014 | Brooksby ......... H04M 3/42391 |
| | | 726/4 |
| 2015/0256985 A1* | 9/2015 | Kornafeld ............... H04W 4/12 |
| | | 455/466 |
| 2015/0264731 A1* | 9/2015 | Lin ........................ H04L 67/26 |
| | | 455/41.2 |
| 2016/0192121 A1* | 6/2016 | Jain ...................... H04W 76/14 |
| | | 455/41.2 |

OTHER PUBLICATIONS

Second Office Action dated Mar. 6, 2019 (11 pages including English translation) from corresponding Chinese Application No. 201510147887.1.

* cited by examiner

500

┌─────────────────────────────────────────┐
│ determining a message transferring relationship │ ─S510
│ among at least two electronic devices, the at least │
│ two electronic devices being connected to the │
│ server by a predetermined account │
└─────────────────────────────────────────┘
                    │
                    ▼
┌─────────────────────────────────────────┐
│ configuring the at least two electronic devices │
│ according to the message transferring │
│ relationship, so that a transferring device of the at │ ─S520
│ least two electronic devices transfers a message to │
│ a receiving device of the at least two electronic │
│ devices according to the message transferring │
│ relationship │
└─────────────────────────────────────────┘

Fig.5

TRANSFERRING CONTROL METHOD AND APPARATUS, AND TRANSFERRING CONFIGURATION METHOD AND APPARATUS

This application claims priority to Chinese Patent Application No. CN 201510147887.1 filed on Mar. 31, 2015; the entire contents of which are incorporated herein by reference.

The present disclosure relates to the field of communication technology, in particular to a transferring control method and apparatus used in an electronic device and a transferring configuration method and apparatus used in a server.

BACKGROUND

Electronic devices are widely popularized with the development of communication technology. The electronic devices comprise for example a smart mobile phone, a tablet computer and so on. Each user may have a plurality of different types of electronic devices. For example, the user may have a mobile phone for work use, a mobile phone for personal information contact use, a tablet computer and so on. Correspondingly, the case that the user does not carry all of his or her electronic devices may occur. For example, the user may find that a mobile phone is left at home after arriving at the office; or it is convenient for the user to carry only one mobile phone when the user goes to the meeting room to have a meeting.

In order to avoid missing important information and so on, it is always desired to answer important calls or receive important information arrived at or received by other electronic devices by using a carry-on electronic device. A part of the existing electronic devices are provided with a call transferring function, but it needs the user to set manually to start or cancel the call transferring function.

SUMMARY

In embodiments of the present disclosure, there are provided a transferring control method and apparatus used in an electronic device and a transferring configuration method and apparatus used in a server.

According to a first aspect, there is provided a transferring control method applicable to a first electronic device, comprising: connecting to a server by a predetermined account; sending to the server a transferring request for requesting the server to perform transferring configuration, wherein the transferring configuration sets a message transferring relationship among a plurality of electronic devices connected to the server by the predetermined account, and the plurality of electronic devices comprise the first electronic device and at least one second electronic device.

Optionally, the transferring control method can further comprise: transferring a message between the first electronic device and the at least one second electronic device.

Optionally, the at least one second electronic device can be at least two second electronic devices, and the transferring configuration is used to set a message transferring relationship among at least two second electronic devices.

Optionally, said transferring a message between the first electronic device and the at least one second electronic device can comprise: receiving transferring configuration information from the server, wherein the transferring configuration information comprises an identifier of the second electronic device used as a receiving device; performing transferring configuration on the first electronic device according to the transferring configuration information; and transferring a message arrived at or received by the first electronic device to the receiving device.

Optionally, said transferring a message arrived at or received by the first electronic device to the second electronic device can comprise: acquiring contact information related to a sending device of a communication message from a contact list of the first electronic device when the first electronic device receives the communication message; and delivering the communication message and the contact information to the second electronic device.

Optionally, the first electronic device can comprise a positioning unit, and the transferring control method can further comprise: determining position information of the first electronic device by using the positioning unit; and delivering the position information to the server.

According to a second aspect, there is provided a transferring configuration method applicable to a server, comprising: determining a message transferring relationship among at least two electronic devices, the at least two electronic devices being connected to the server by a predetermined account; configuring the at least two electronic devices according to the message transferring relationship, so that a transferring device of the at least two electronic devices transfers a message to a receiving device of the at least two electronic devices according to the message transferring relationship.

Optionally, said determining a message transferring relationship among at least two electronic devices can comprise: acquiring position information of the at least two electronic devices; determining a message transferring relationship among the at least two electronic devices based on the position information.

Optionally, said determining a message transferring relationship among at least two electronic devices can comprise: receiving a transferring request from a first electronic device of the at least two electronic devices; and determining the message transferring relationship among at least two electronic devices based on the transferring request.

Optionally, said receiving a transferring request from the first electronic device of the at least two electronic devices can comprise: receiving from the first electronic device a transferring request for determining a message transferring relationship between a second electronic device and a third electronic device, wherein the second electronic device and the third electronic device are electronic devices of the at least two electronic devices being different from the first electronic device.

According to a third aspect, there is provided a transferring control apparatus applicable to a first electronic device, comprising: a log-in unit configured to be connected to a server by a predetermined account; a requesting unit configured to send to the server a transferring request for requesting the server to perform transferring configuration, wherein the transferring configuration sets a message transferring relationship among a plurality of electronic devices connected to the server by the predetermined account, and the plurality of electronic devices comprise the first electronic device and at least one second electronic device.

Optionally, the transferring control apparatus can further comprise: a transfer executing unit configured to transfer a message between the first electronic device and the at least one second electronic device.

Optionally, the at least one second electronic device can be at least two second electronic devices, and the transferring configuration is used to set a message transferring relationship among at least two second electronic devices.

Optionally, the transfer executing unit can comprise: a receiving means configured to receive transferring configuration information from the server, wherein the transferring configuration information comprises an identifier of the second electronic device used as a receiving device; a configuring means configured to perform transferring configuration on the first electronic device according to the transferring configuration information; and a sending means configured to transfer a message arrived at or received by the first electronic device to the receiving device.

Optionally, the sending means acquires contact information related to a sending device of a communication message from a contact list of the first electronic device when the first electronic device receives the communication message and delivers the communication message and the contact information to the second electronic device.

Optionally, the transferring control apparatus can further comprise: a positioning unit configured to determine position information of the first electronic device; and an information delivering unit configured to deliver the position information to the server.

According to a fourth aspect, there is provided a transferring configuration apparatus applicable to a server, comprising: a determining unit configured to determine a message transferring relationship among at least two electronic devices, the at least two electronic devices being connected to the server by a predetermined account; a configuring unit configured to configure the at least two electronic devices according to the message transferring relationship, so that a transferring device of the at least two electronic devices transfers a message to a receiving device of the at least two electronic devices according to the message transferring relationship.

Optionally, the determining unit can acquire position information of the at least two electronic devices and determine the message transferring relationship among the at least two electronic devices based on the position information.

Optionally, the determining unit can comprise: a receiving means configured to receive a transferring request from the first electronic device of the at least two electronic devices; and a determining means configured to determine the message transferring relationship among at least two electronic devices based on the transferring request.

Optionally, the receiving means can receive from the first electronic device a transferring request for determining a message transferring relationship between a second electronic device and a third electronic device, wherein the second electronic device and the third electronic device are electronic devices of the at least two electronic devices being different from the first electronic device.

With the transferring control method and apparatus and the transferring configuration method and apparatus according to the embodiments of the present disclosure, the message transferring among the electronic devices connected to the server by a same account is configured by using the server, which is capable of controlling the message transferring among different electronic devices easily and conveniently, so as to improve the user experience.

BRIEF DESCRIPTION OF THE DRAWINGS

In order to describe technical solutions of embodiments of the present disclosure more clearly, drawings needed to be used in description of the embodiments or the prior art would be introduced below simply. Obviously, drawings described below are just some embodiments of the present disclosure. Other drawings can be obtained for those skilled in the art based on these drawings without paying any inventive labor.

FIG. 5 is an exemplary flow chart of a transferring configuration method used in a server according to an embodiment of the present disclosure.

DETAILED DESCRIPTION

The technical solutions in embodiments of the present disclosure would be described clearly and completely by combining with the accompanying drawings in the embodiments of the present disclosure. Obviously, the embodiments described are a part of embodiments of the present disclosure instead of all the embodiments of the present disclosure.

Figure 1:
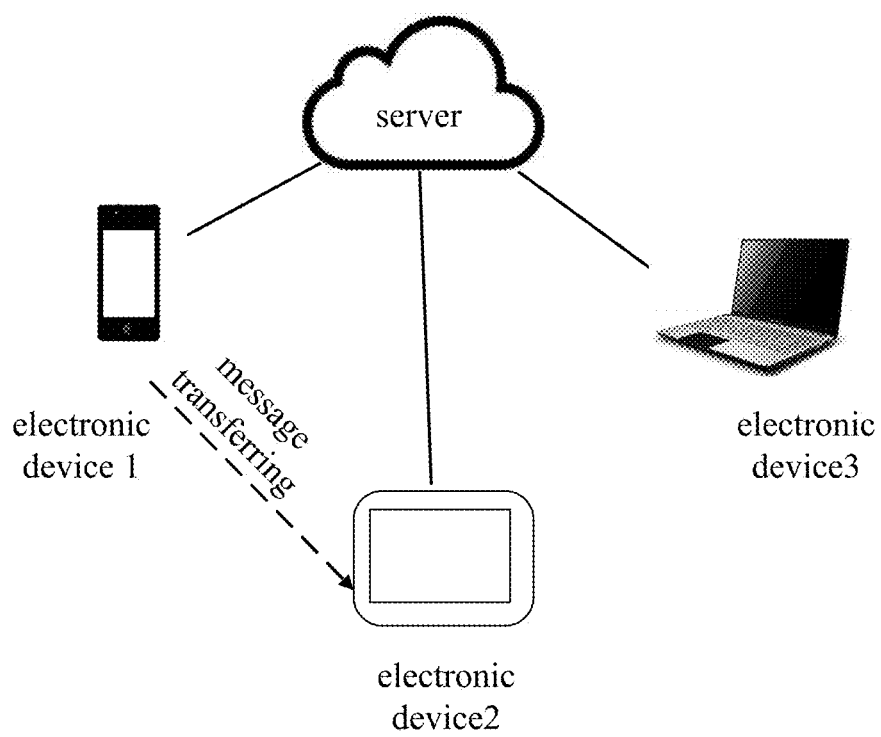
FIG. 1 is an exemplary architecture diagram of application scene of an embodiment of the present disclosure.

FIG. 1 is an exemplary architecture diagram of application scene of an embodiment of the present disclosure. As shown in FIG. 1, three electronic devices can be connected to a same server. The three electronic devices comprise an electronic device 1 being a smart mobile phone, an electronic device 2 being a tablet computer and an electronic device 3 being a notebook computer. This is just for illustration, and the respective electronic devices can be a same type or different types. The server is for example a computer, a smart mobile phone and a cloud server and so on, and is capable of communicating with at least two of the respective electronic devices.

Typically, a user of electronic devices may not carry the electronic device 1 at work, or the user can only carry the notebook computer because it is inconvenient for him/her to carry the mobile phone at the meeting. However, the user may in urgent desire messages arrived at or received by the electronic devices not carried by the user, for example calls, short messages, voice messages, WeChat messages, QQ messages. Therefore, it needs to make the electronic devices have a message transferring function, so that the received messages can be transferred to other electronic devices. The embodiment of the present disclosure is capable of configuring the electronic devices appropriately so as to transfer messages among different electronic devices. Such configuration can be realized with little participation of the user or even may be realized automatically. Compared with the manner of manually configuring the electronic device to start or cancel the call transferring function, the setting operation in the embodiment of the present disclosure is easy relatively, and can realize transferring of relatively complicated messages.

Figure 2:
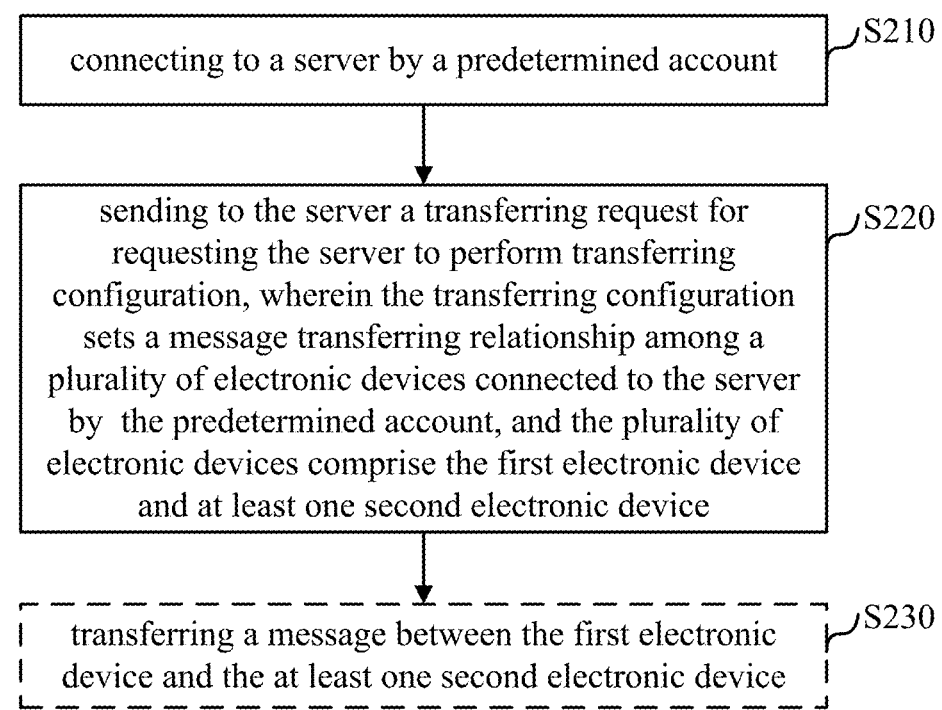
FIG. 2 is an exemplary flow chart of a transferring control method used in an electronic device according to an embodiment of the present disclosure.

FIG. 2 is an exemplary flow chart of a transferring control method 200 used in an electronic device according to an embodiment of the present disclosure. An electronic device to which the transferring control method 200 is applied is corresponding to any one electronic device as shown in FIG. 1, and can be for example a mobile phone, a tablet computer, a smart watch, a notebook computer and so on. The type of the electronic device does not form a limitation to the embodiment of the present disclosure. In order to distinguish different electronic devices, the electronic device to which the transferring control method 200 is applied is called as a first electronic device.

As shown in FIG. 2, the transferring control method 200 can comprise: connecting to a server by a predetermined account (S210); sending to the server a transferring request for requesting the server to perform transferring configuration, wherein the transferring configuration sets a message transferring relationship among a plurality of electronic devices connected the server by the predetermined account, and the plurality of electronic devices comprise a first electronic device and at least one second electronic device (S220).

In general, the user of the electronic device sets the predetermined account in the server in advance, and logs in to the server with the predetermined account. The server can identify the corresponding electronic device when viewing the predetermined account. In step S210, the user can log in the predetermined account in the electronic device, so that the electronic device is connected to the server by the predetermined account. In particular, the electronic device can be connected to the server through 3G communication network, 4G communication network and so on, or can be connected to the server through near field communication technology. The near field communication technology is for example WiFi communication technology, Bluetooth communication technology and so on. The server is the server as shown in FIG. 1, and may be a mobile phone, a notebook computer or a cloud computer and so on. According to the predetermined account, the server can identify the electronic device, can identify the user of the electronic device, and associate the electronic device with other electronic devices of the same user.

In step S220, the transferring request is sent to the server. The transferring request can be sent for example when the user of the first electronic device recognizes that other electronic devices are not carried or when the user of the first electronic device desires to obtain the latest information arrived at or received by other electronic devices. The transferring request is used for requesting the server to perform transferring configuration.

The transferring configuration is used to set a message transferring relationship among the plurality of electronic devices connected to the server by the predetermined account. In practice, connecting the plurality of electronic devices to the server by the predetermined account may be connecting the plurality of electronic devices to the server by using a same account name, or may be connecting the plurality of electronic devices to the server by using associated account names. The associated account names can be for example Peter-phone, Peter-pad, Peter-pc and so on. That is, the predetermined account may be the same account name used by the plurality of electronic devices, or may be a plurality of different associated account names used by the plurality of electronic devices. By using the predetermined account, the server can identify the first electronic device, and is capable of identifying other electronic devices between which and the first electronic device a message may be transferred.

The message transferring relationship is set by the transferring configuration performed by the server. The message transferring relationship can be message transferring between any electronic devices of the plurality of electronic devices connected to the server by the predetermined account. The message transferring relationship can indicate a transferring device of the plurality of electronic devices which transfers its own message and a receiving device thereof which receives a message transferred by the transferring device. The message transferring relationship can further indicate the type and transferring mode and so on of the message being transferred. The number of the transferring device can be one or more. The number of the receiving device can also be one or more.

Besides the first electronic device, the plurality of electronic devices associated with the predetermined account can further comprise two or even more other electronic devices. The transferring configuration can set the message transferring relationship between two or even more other electronic devices. Assuming that the plurality of electronic devices connected to the server by the predetermined account comprise the above first electronic device, second electronic device and third electronic device, the message transferring relationship can indicate: the first electronic device is a transferring device while the second electronic device is a receiving device; or the first electronic device is a receiving device while the third electronic device is a transferring device; or the second electronic device is a transferring device while the third electronic device is a receiving device and so on and so forth.

The message transferring relationship can be indicated in the transferring request sent in step S220. Or, the transferring request can only indicate the transferring device while the receiving device is determined from the plurality of electronic devices by the server. Or, the transferring request can only indicate the receiving device while the transferring device is determined from the plurality of electronic devices by the server. Or, the transferring request can only indicate that message transferring needs to be performed among the plurality of electronic devices while the transferring device and the receiving device are determined by the server. Later, the server configures the respective electronic devices involved according to the message transferring relationship, so as to realize message transferring. The message transferring relationship set by the server according to the transferring configuration may involve the first electronic device, or may not involve the first electronic device. When the first electronic device is not involved, the first electronic device does not participate in the message transferring; when the first electronic device is involved, the transferring control method applicable to the first electronic device further comprises transferring a message between the first electronic device and the at least one second electronic device (S230), as shown in the dotted line block in FIG. 2.

In step S230, the first electronic device can transfer its message to one or more other electronic devices associated with the predetermined account, and can further receive a message from other electronic devices associated with the predetermined account. When the first electronic device is used as a receiving device to receive the message, the configuration of the first electronic device is simple relatively, for example, forbidding the first electronic device to be in a flight mode, or initiating data receiving function and communication function and so on of the first electronic device. When the first electronic device is used as a transferring device to send the message, the transferring configuration is performed on the first electronic device to transfer the message in step S230.

Figure 3:
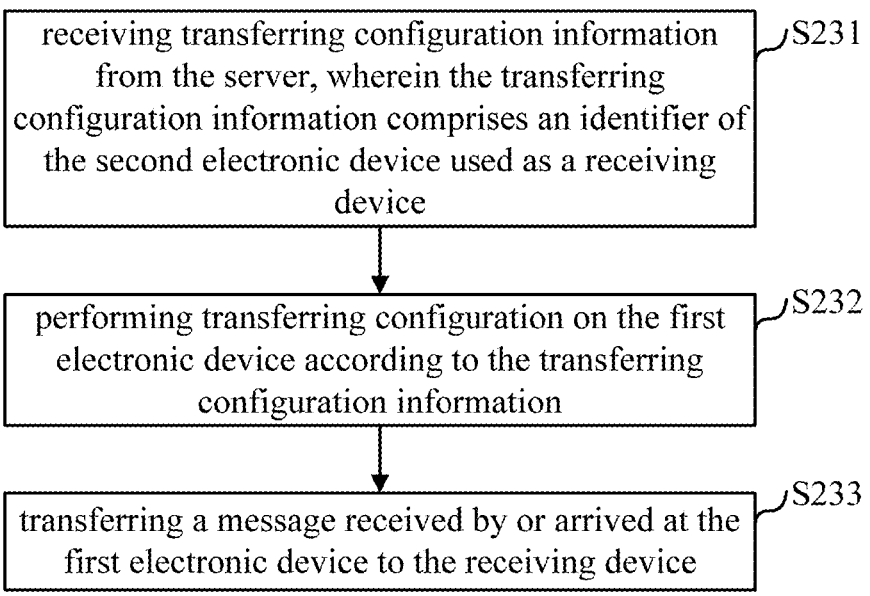
FIG. 3 is an exemplary flow chart of a message transferring step in the transferring control method in FIG. 2.

FIG. 3 is an exemplary flow chart of the message transferring step in the transferring control method in FIG. 2. As shown in FIG. 3, transferring configuration information is received from the server, the transferring configuration information comprises an identifier of the electronic device used as the receiving device (S231); the transferring configuration is performed on the first electronic device according to the transferring configuration information (S232); the message arrived at or received by the first electronic device is transferred to the receiving device (S233). The transferring configuration information received in step S231 indicates the receiving device, for example, indicating the telephone number, WeChat number and so on of the receiving device. In addition, the transferring configuration information can further indicate the type of the message to be transferred, for example, missed calls, short messages and so on corresponding to a telephone number. In step S232, relevant applications or functions of the first electronic device are configured automatically. Message transferring is realized in step S233.

In step S233, when the first electronic device receives a communication message, the content of the communication message and the number of the sending device can be directly transferred to the receiving device. The communication message can be for example missed calls, short messages, WeChat messages, and QQ messages and so on. In particular, for the short messages, the content of the short messages and the telephone number of the sending device of a sender can be sent to the receiving device; for the WeChat messages, the content of the WeChat and the WeChat number of the sending device can be sent to the receiving device.

Or, in step S233, when the first electronic device receives the communication message, contact information related with the sending device of the communication message can be obtained from a contact list of the first electronic device; the communication message and the contact information are delivered to the receiving device. The contact information is for example the contact name, the contact nickname and so on. In particular, the content of the short messages, the telephone number of the sender and the name of the sender can be delivered to the receiving device in a way of short message; the WeChat content, the WeChat number of the sending device and the nickname of the sender can be delivered to the receiving device in a way of WeChat. Based on the contact information, the user of the receiving device can easily identify the actual sender of the transfer message received.

In the technical solution of the transferring control method according to the embodiment of the present disclosure, through configuring the message transferring between the electronic devices connected to the server by using the same account, message transferring between different electronic devices can be controlled easily and conveniently, so as to improve the user experience.

Figure 4:
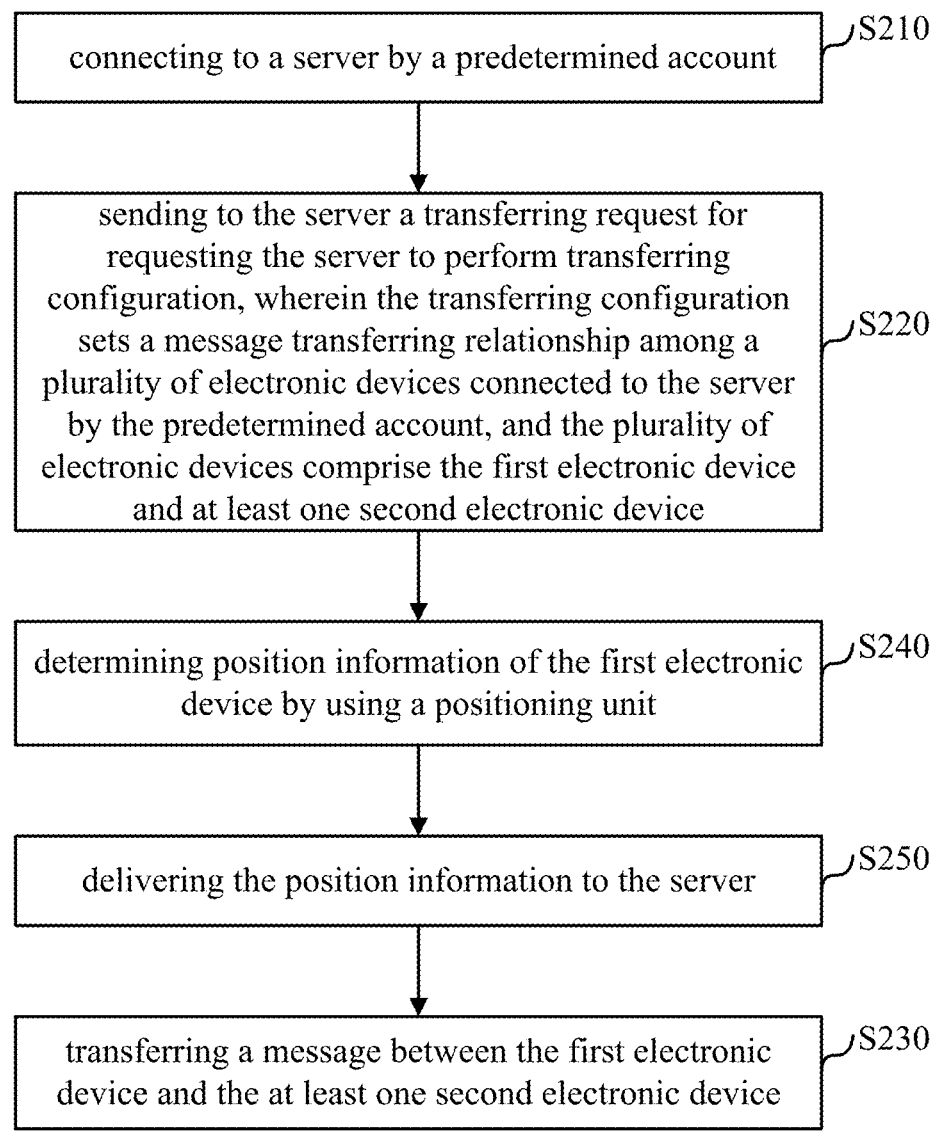
FIG. 4 is an exemplary flow chart of another transferring control method used in an electronic device according to an embodiment of the present disclosure.

FIG. 4 is an exemplary flow chart of another transferring control method 400 used in an electronic device according to an embodiment of the present disclosure. In FIG. 4, the steps same as those in FIG. 2 are indicated by using the same reference marks. Steps S210, S220 and S230 in FIG. 4 are the same as the corresponding steps in FIG. 2, and can refer to the description given with reference to FIG. 2. FIG. 4 differs from FIG. 2 in that steps S240 and S250 are added. In step S240, position information of the first electronic device is determined by using a positioning unit. In step S250, the position information is delivered to the server.

In step S240, position information of the first electronic device can be determined by using GPS orientator in the first electronic device. In step S250, the position information can be sent in a way same as the way of sending the transferring request in step S220. The server can perform the transferring configuration based on the position information received from the first electronic device. For example, the server can receive the position information of the respective electronic devices associated with the predetermined account, and for example when the distance from the second electronic device to the first electronic device is smaller than a predetermine distance value (for example, 100 m, 200 m, etc.), in the case of the first electronic device being the transferring device, the second electronic device would not be set as the receiving device; in the case of the first electronic device being the receiving device, the second electronic device would not be set as the transferring device. By using the steps S240 and S250, the position information of the first electronic device can be delivered to the server, so as to help the server to perform the transferring configuration.

FIG. 5 is an exemplary flow chart of a transferring configuration method 500 used in a server according to an embodiment of the present disclosure. The server corresponds to the server in FIG. 1, and would be for example a computer, a smart mobile phone, a cloud server, etc. This server can be connected to a plurality of electronic devices by using the predetermined account. The server can be located at home or office of the user of the plurality of electronic devices, or can be located in the cloud network. The type and position of the server does not form a limitation to the embodiment of the present disclosure.

As shown in FIG. 5, the transferring configuration method 500 can comprise: determining a message transferring relationship among at least two electronic devices, the at least two electronic devices being connected to the server by the predetermined account (S510); and configuring the at least two electronic devices according to the message transferring relationship, so that the transferring device of the at least two electronic devices transfers a message to the receiving device according to the message transferring relationship (S520).

The user can establish or create a predetermined account in the server in advance through an electronic device, and associate his/her respective electronic devices with this predetermined account. The respective electronic devices are connected to the server by the predetermined account. The user can control his/her electronic devices through the predetermined account. The server can identify the user's respective electronic devices according to the predetermined account. The server can have a plurality of different predetermined accounts, and perform the transferring configuration method 500 according to the embodiment of the present disclosure with respect to the electronic devices associated with each predetermined account.

Connecting the plurality of electronic devices to the server by the predetermined account may be connecting the plurality of electronic devices to the server by using a same account name (for example, Peter), or may be connecting the plurality of electronic devices to the server by using associated account names. The associated account names can be for example Peter-phone, Peter-pad, Peter-pc and so on. That is, the predetermined account may be the same account name used by the plurality of electronic devices, or may be a plurality of different associated account names used by the plurality of electronic devices.

In step S510, the message transferring relationship among the at least two electronic devices connected to the server by the predetermined account is determined. Typically, the message transferring relationship indicates, in the plurality of electronic devices, a transferring device configured to transfer its own message and a receiving device configured to receive a message transferred by the transferring device. The message transferring relationship can further indicate the type and transferring mode and so on of the transferred message. The number of the transferring device can be one or more. The number of the receiving device can also be one or more. The message transferring relationship can be message transferring between any electronic devices of the plurality of electronic devices connected to the server by the predetermined account. Assuming that the plurality of electronic devices connected to the server by the predetermined account comprise the above first electronic device, second electronic device and third electronic device, the message transferring relationship can indicate: both or one of the first electronic device and the third electronic device are or is the transferring device, and the second electronic device is the receiving device; or the first electronic device is the receiving device, and both or one of the second electronic device and the third electronic device are or is the transferring device, and so on and so forth.

The message transferring relationship can be determined by means of various ways in step S510. As an example, the position information of the at least two electronic devices is acquired, and the message transferring relationship among the at least two electronic devices is determined based on the position information. Assuming that the notebook computer and the mobile phone of a user Peter are connected to the server by a predetermined account Peter and Peter only carries the notebook computer but leaves the mobile home at home when going to the office, for example, positions can be acquired through the orientators on the notebook computer and the mobile phone. If the position of the notebook computer is a street nearby the home of Peter while the position of the mobile phone is the home of Peter and the distance between the two positions is greater than a predetermined distance value (for example, 100 m, 200 m, etc.), then it can be determined that the user does not carry the mobile phone, and then the mobile phone of Peter is set as the transferring device and the notebook computer of Peter is set as the receiving device. If the distance between the position of the notebook computer and the position of the mobile phone is less than the predetermined distance value, then it is possible that Peter is walking in the residential area. Correspondingly, the operation of determining in step S510 is not performed. In step S510, the position information of respective electronic devices associated with the predetermined account can be received periodically, and the message transferring relationship among the respective electronic devices is determined.

Alternatively, in step S510, the message transferring relationship can be determined according to the transferring request from one of the electronic devices associated with the predetermined account. In particular, the transferring request is received from the first electronic device of the at least two electronic devices associated with the predetermined account; and the message transferring relationship among the at least two electronic devices is determined based on the transferring request. The transferring request received can comprise the message transferring relationship, or the transferring request received can only indicate the transferring device or a part thereof, or only indicate the receiving device or a part thereof. In the case that the transferring request indicates the transferring device, the server can determine the receiving device based on state of electronic devices associated with the predetermined account. In the case that the transferring request indicates the receiving device, the server can determine the transferring device based on the state of the electronic devices associated with the predetermined account. For example, the transferring request received from the first electronic device can comprise the message transferring relationship between the second electronic device and the third electronic device. The second electronic device and the third electronic device are electronic devices of the respective electronic devices associated with the predetermined account being different from the first electronic device. At this time, the first electronic device is a control device of the respective electronic devices associated with the predetermined account.

In step S520, configuration information is sent to the transferring device and the receiving device indicated by the message transferring relationship, so as to perform configuration on the electronic devices, so that the transferring device transfers the message to the receiving device based on the message transferring relationship.

The configuration information sent to the transferring device can comprise an identifier of the receiving device, for example, telephone number, WeChat number and so on of the receiving device. The configuration information sent to the transferring device can further comprise the type of information transferred by the transferring device, for example, missed calls, short messages and so on corresponding to the telephone number. Then, the transferring device automatically configures relevant applications or functions, and transfers the message to the receiving device according to the identifier of the receiving device.

The configuration information sent to the receiving device is relatively simple, for example, forbidding the receiving device to be in the flight mode, or initiating data receiving function, communication function and so on of the receiving device, so as to ensure that the receiving device is capable of receiving the message from the transferring device. In addition, the configuration information sent to the receiving device can further comprise at least one of identifier and message type of the transferring device, so that the receiving device is capable of knowing the type and transferring party and so on of the received message in advance. In addition, the server can configure the respective transferring devices and receiving devices through 3D communication network and 4G communication network, and can perform the configuring operation through the nearby field communication technology.

In the technical solution of the transferring control apparatus according to the embodiment of the present disclosure, the message transferring among the electronic devices connected to the server by the same account is configured by using the server, which is capable of controlling message transferring among different electronic devices easily and conveniently, so as to improve the user experience.

Figure 6:
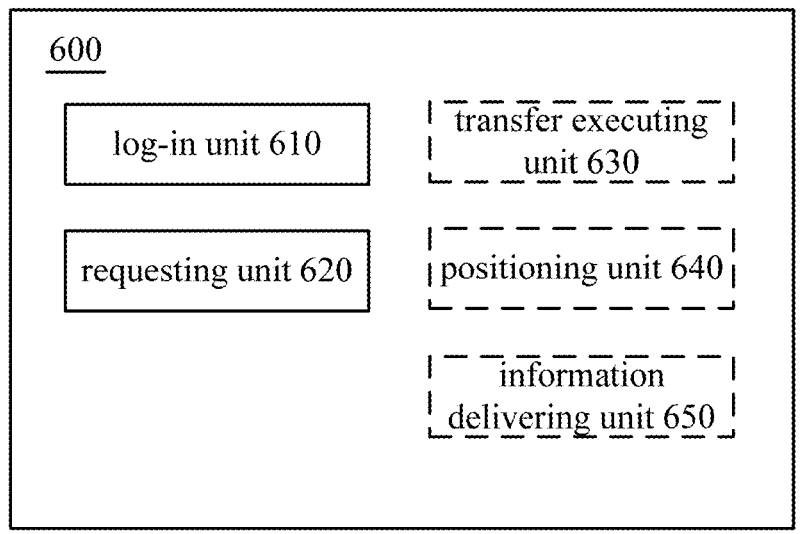
FIG. 6 is an exemplary block diagram of a transferring control apparatus used in an electronic device according to an embodiment of the present disclosure.

FIG. 6 is an exemplary block diagram of a transferring control apparatus 600 used in an electronic device according to an embodiment of the present disclosure. An electronic device to which the transferring control apparatus 600 is applied is corresponding to any electronic device as shown in FIG. 1, and can be for example a mobile phone, a tablet computer, a smart watch, a notebook computer and so on. The type of the electronic device does not form a limitation to the embodiment of the present disclosure. In order to distinguish different electronic devices, the electronic device to which the transferring control apparatus 600 is applied is called as a first electronic device.

As shown in FIG. 6, the transferring control apparatus 600 can comprise: a log-in unit 610 configured to be connected to a server by a predetermined account; a requesting unit 620 configured to send to the server a transferring request for requesting the server to perform transferring configuration, wherein the transferring configuration is used to set a message transferring relationship among the respective electronic devices connected to the server by the predetermined account, and at least one second electronic device is also connected to the server by the predetermined account.

In general, the log-in unit 610 creates or establishes the predetermined account in the server in advance, and is connected to the server by the determined account. The server can identify the corresponding electronic device when viewing the predetermined account. In step S210, the user can log in the predetermined account in the electronic device, so that the electronic device is connected to the server by the predetermined account. In particular, the electronic device can be connected to the server through 3G communication network, 4G communication network and so on, or can be connected to the server through near field communication technology.

The requesting unit 620 sends a transferring request to the server. The requesting device 620 can send the transferring request when the user of the first electronic device recognizes that other electronic devices are not carried or when the user of the first electronic device desires to obtain the latest information arrived at or received by said other electronic devices. The transferring request is used for requesting the server to perform transferring configuration.

The transferring configuration is used to set a message transferring relationship among the plurality of electronic devices connected to the server by the predetermined account. The predetermined account may be the same account name used by the plurality of electronic devices, or may be a plurality of different associated account names used by the plurality of electronic devices. By using the predetermined account, the server can identify the first electronic device, and is capable of identifying other electronic devices between which and the first electronic device a message may be transferred.

The message transferring relationship is the transferring configuration setting performed by the server. The message transferring relationship can be message transferring between any electronic devices of the plurality of electronic devices connected to the server by the predetermined account. The message transferring relationship can indicate, in the plurality of electronic devices, a transferring device configured to transfer its own message and a receiving device configured to receive a message transferred by the transferring device. The message transferring relationship can indicate the type and transferring mode and so on of the transferred message. The number of the transferring device can be one or more. The number of the receiving device can also be one or more. Assuming that the plurality of electronic devices connected to the server by the predetermined account comprise the above first electronic device, second electronic device and third electronic device, the message transferring relationship can indicate: the first electronic device is a transferring device while the second electronic device is a receiving device; or the first electronic device is a receiving device while the third electronic device is a transferring device; or the second electronic device is a transferring device while the third electronic device is a receiving device and so on and so forth.

The transferring request sent by the requesting unit 620 can indicate the message transferring relationship, or can only indicate the transferring device or the receiving device. Correspondingly, the receiving device or the transferring device is determined by the server. Or, the transferring request can only indicate that it needs to perform message transferring among the plurality of electronic devices while the transferring device and the receiving device are determined by the server.

The server configures the respective electronic devices involved according to the message transferring relationship, so as to realize message transferring. The message transferring relationship set by the server according to the transferring configuration may involve the first electronic device, or may not involve the first electronic device. When the first electronic device is not involved, the first electronic device does not participate in the message transferring; when the first electronic device is involved, the transferring control apparatus applicable to the first electronic device further comprises a transfer executing unit 630 in FIG. 6.

The transfer executing unit 630 transfers a message between the first electronic device and the at least one second electronic device. The transfer executing unit 630 can transfer the message of the first electronic device to one or more other electronic devices associated with the predetermined account, and can receive the message from one or more other electronic devices associated with the predetermined account. When the first electronic device is used as a receiving device to receive the message, the transfer executing unit 630 can for example forbid the first electronic device to be in a flight modem, or initiate data receiving function and communication function and so on of the first electronic device. When the first electronic device is used as a transferring device to send the message, the transfer executing unit 630 performs transferring configuration on the first electronic device to transfer the message.

Figure 7:
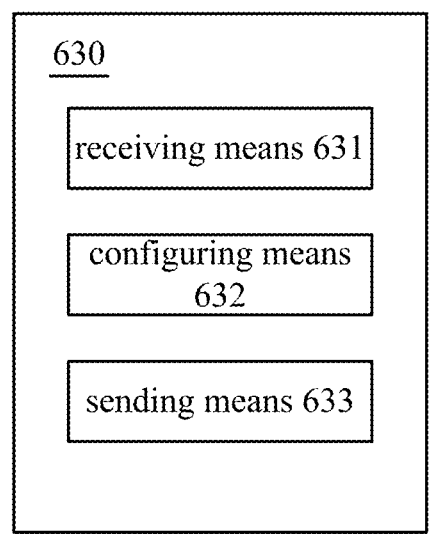
FIG. 7 is an exemplary block diagram of a transfer executing unit in the transferring control apparatus in FIG. 6.

FIG. 7 is an exemplary block diagram of the transfer executing unit 630 in the transferring control apparatus in FIG. 6. As shown in FIG. 7, the transfer executing unit 630 comprises: a receiving means 631 configured to receive transferring configuration information from the server, wherein the transferring configuration information comprises an identifier of the electronic device used as the receiving device; a configuring means 632 configured to perform the transferring configuration on the first electronic device according to the transferring configuration information; and a sending means 633 configured to transfer the message of the first electronic device to the receiving device. The transferring configuration information received by the receiving means 631 indicates the receiving device, for example, indicating the telephone number, WeChat number and so on of the receiving device. In addition, the transferring configuration information can further indicate the type of the message to be transferred, for example, missed calls, short messages and so on corresponding to telephone numbers. The configuring means 632 automatically configures relevant applications or functions of the first electronic device. The sending means 633 realizes message transferring.

The sending means 633 can directly transfer the content of the communication message and the number of the sending device to the receiving device. The communication message can be for example missed calls, short messages, WeChat messages, and QQ messages, etc. In particular, for the short messages, the content of the short messages and the telephone number of the sending device of a sender can be sent to the receiving device; for the WeChat messages, the content of the WeChat and the WeChat number of the sending device can be sent to the receiving device. Or, the sending means 633 can obtain contact information related with the sending device of the communication message from a contact list of the first electronic device; the communication message and the contact information are delivered to the receiving device. The contact information is for example the contact name, the contact nickname and so on. In particular, the sending means 633 can deliver the content of the short messages, the telephone number of the sender and the name of the sender to the receiving device in a way of short message, and can deliver the WeChat content, the WeChat number of the sending device and the nickname of the sender to the receiving device in a way of WeChat. Based on the contact information, the user of the receiving device can identify the actual sender of the transferred message received easily.

Optionally, the transferring control apparatus 600 can further comprise: a positioning unit 640 configured to determine position information of the first electronic device; an information delivering unit 650 configured to deliver the position information to the server. The positioning unit 640 can be for example the GPS orientator. The information delivering unit 650 can send the position information in a way same as the way of sending the transferring request by the requesting unit 620, and the two can be realized by the same communication module. The server can perform transferring configuration based on the position information received from the first electronic device. For example, when the distance from the second electronic device to the first electronic device is smaller than a predetermine distance value (for example, 100 m, 200 m, etc.), in the case of the first electronic device being the transferring device, the server would not set the second electronic device as the receiving device; in the case of the first electronic device being the receiving device, the server would not set the second electronic device as the transferring device. The server can set one of the first electronic device and the second electronic device as the transferring device and set the other as the receiving device when the distance from the second electronic device to the first electronic device is greater than the predetermined distance.

The log-in unit 610, the requesting unit 620 and the configuring means 632 in the transfer executing unit 630 may be implemented by one or more processors in the electronic device to which the transferring control apparatus 600 is applied, and may particularly implemented by the one or more processors in the electronic device executing program instructions stored in one or more storage means in the electronic device.

In the technical solution of the transferring control apparatus according to the embodiment of the present disclosure, through configuring the message transferring among the electronic devices connected to the server by using the same account, message transferring by using different electronic devices can be controlled easily and conveniently, so as to improve the user experience.

Figure 8:
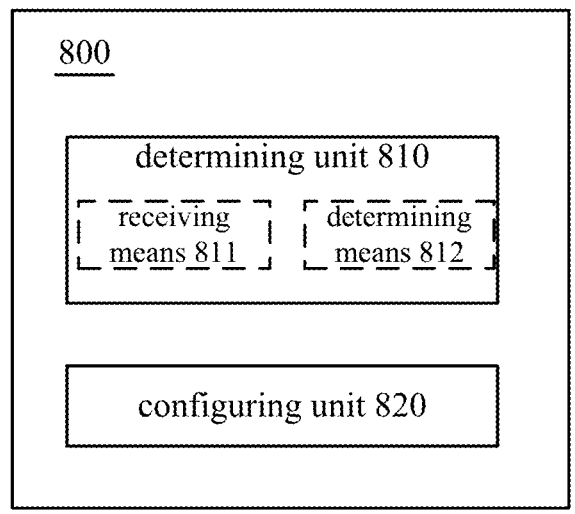
FIG. 8 is an exemplary block diagram of a transferring configuration apparatus used in a server according to an embodiment of the present disclosure.

FIG. 8 is an exemplary block diagram of a transferring configuration apparatus 800 used in a server according to an embodiment of the present disclosure. The server corresponds to the server in FIG. 1. The server can be located at home or office of the user of the plurality of electronic devices, or can be located in the cloud network. The type and position of the server does not form a limitation to the embodiment of the present disclosure.

As shown in FIG. 8, the transferring configuration apparatus 800 can comprise: a determining unit 810 configured to determine a message transferring relationship among at least two electronic devices, the at least two electronic devices being connected to the server by the predetermined account; and a configuring unit 820 configured to configure the at least two electronic devices according to the message transferring relationship, so that the transferring device of the at least two electronic devices transfers a message to the receiving device according to the message transferring relationship.

The user can establish or create a predetermined account in the server in advance through an electronic device, and associate his/her respective electronic devices with this predetermined account. The respective electronic devices are connected to the server by the predetermined account. The server can identify the user's respective electronic devices according to the predetermined account. The server can have a plurality of different predetermined accounts, and perform the transferring configuration method with respect to the electronic devices associated with each predetermined account. The predetermined account can be the same account name used by the plurality of electronic devices or may be a plurality of different associated account names used by the plurality of electronic devices.

The determining unit 810 determines the message transferring relationship among the at least two electronic devices connected to the server by the predetermined account. Typically, the message transferring relationship indicates, in the plurality of electronic devices, a transferring device configured to transfer its own message and a receiving device configured to receive a message transferred by the transferring device. The message transferring relationship can further indicate the type and transferring mode and so on of the transferred message. The number of the transferring device can be one or more. The number of the receiving device can also be one or more. The message transferring relationship can be message transferring between any electronic devices of the plurality of electronic devices connected to the server by the predetermined account.

The determining unit 810 can determine the message transferring relationship by means of various ways. As an example, the determining unit 810 acquires the position information of the at least two electronic devices, and determines the message transferring relationship among the at least two electronic devices based on the position information. Assuming that the notebook computer and the mobile phone of a user Peter are connected to the server by using a predetermined account Peter, the position of the notebook computer is a street nearby the home of Peter while the position of the mobile phone is the home of Peter. The determining unit 810 can set the mobile phone of Peter as the transferring device and set the notebook computer of Peter as the receiving device when the distance between the two positions is greater than a predetermined distance value. If the distance between the position of the notebook computer and the position of the mobile phone is less than the predetermined distance value, then it is possible that Peter is walking in the residential area. Correspondingly, the determining unit 810 does not determine the message transferring relationship. In addition, the determining unit 810 can receive the position information of respective electronic devices associated with the predetermined account periodically, and determine the message transferring relationship among the respective electronic devices.

Alternatively, the determining unit 810 can determine the message transferring relationship according to the transferring request from one of the electronic devices associated with the predetermined account. In particular, the determining unit 810 can comprise: a receiving means 811 configured to receive the transferring request from the first electronic device of the at least two electronic devices; and a determining means 812 configured to determine the message transferring relationship among the at least two electronic devices based on the transferring request.

The transferring request received by the receiving means 811 can comprise the message transferring relationship. Or, the transferring request received can only indicate the transferring device or a part thereof, or only indicate the receiving device or a part thereof. In the case that the transferring request indicates the transferring device, the determining means 812 can determine the receiving device based on state of the electronic devices associated with the predetermined account. In the case that the transferring request indicates the receiving device, the determining means 812 can determine the transferring device based on the state of the electronic devices associated with the predetermined account. For example, the transferring request received from the first electronic device can comprise the message transferring relationship between the second electronic device and the third electronic device. The second electronic device and the third electronic device are electronic devices of the respective electronic devices associated with the predetermined account being different from the first electronic device. At this time, the first electronic device is a control device of the respective electronic devices associated with the predetermined account.

The configuring unit 820 sends configuration information to the transferring device and the receiving device indicated by the message transferring relationship, so as to perform configuration on the electronic devices, so that the transferring device transfers the message to the receiving device based on the message transferring relationship.

The configuration information sent by the configuring unit 820 to the transferring device can comprise an identifier of the receiving device, for example, telephone number, WeChat number, and so on of the receiving device. The configuration information sent by the configuration unit 820 to the transferring device can further comprise the type of the information transferred by the transferring device, for example, missed calls, short messages and so on corresponding to the telephone number. Then, the transferring device configures relevant applications or functions automatically, and transfers the message to the receiving device according to the identifier of the receiving device.

The configuration information sent by the configuring unit 820 to the receiving device is relatively simple, for example, forbidding the receiving device to be in the flight mode, or initiating data receiving function, communication function and so on of the receiving device, so as to ensure that the receiving device is capable of receiving the message from the transferring device. The configuration information sent by the configuring unit 820 to the receiving device can further comprise at least one of identifier and message type of the transferring device, so that the receiving device is capable of knowing the type and transferring party and so on of the message received. In addition, the server can configure the respective transferring devices and receiving devices trough 3D communication network and 4G communication network, and can perform the configuring operation through the nearby field communication technology.

The determining means 811 in the determining unit 810 and the configuring unit 820 may be implemented by one or more processors in the server to which the transferring configuration apparatus 800 is applied, and may particularly implemented by the one or more processors in the server executing program instructions stored in one or more storage means in the server.

In the technical solution of the transferring control apparatus according to the embodiment of the present disclosure, the message transferring among the electronic devices connected to the server by using the same account is configured by using the server, which is capable of controlling message transferring among different electronic devices easily and conveniently, so as to improve the user experience.

In the application, any one of the transferring control apparatus 600 and the transferring configuration apparatus 800 can be implemented as a memory and a processor. The memory is configured to store program codes. The processor is configured to execute the program codes so as to implement functions of respective units of an information processing apparatus. The memory can comprise at least one of a read-only memory and a random-access memory, and provides instruction and data to the processor. A part of the memory can further comprise a non-volatile random-access memory (NVRAM). The processor can be a general-purpose processor, a digital signal processor (DSP), an application specific integrated circuit (ASIC), a field programmable gate array (FPGA) or other programmable logic devices, a discrete gate or transistor logic device, a discrete hardware component. The general-purpose processor can be a micro processor or any conventional processor and so on.

Those ordinary skilled in the art can recognize that it can be realized by an electronic hardware or a combination of a computer software and the electronic hardware in combination with the units and algorithm steps of respective examples described in the embodiments of the present disclosure. Executing these functions by means of hardware or software depends on specific applications and design constraint conditions of the technical solutions. Technicians can use different methods for each specific application to implement the functions described above, but such implementation cannot be regarded as going beyond the scope of the present application.

Those skilled in the art can clearly understand that in order to describe the present invention simply and conveniently, the specific operations of the information processing apparatus and electronic device described above can refer to descriptions corresponding to respective steps in the method embodiments.

In the several embodiments provided in the present disclosure, it should be understood that the devices and methods disclosed therein can be implemented in other ways. For example, the apparatus embodiments described above are just for illustration. For example, division of the units is just a logic functional division, and thus there would be additional ways of division in the actual implementation. For example, a plurality of units or components can be combined or integrated into another device, or some features can be omitted or are not executed.

Units described as separable means may be or may not be separated physically, and means used as a display unit may be or may not be a physical unit. A part or all of the units can be selected to realize the purpose of the solutions of the present embodiments according to the actual requirements.

The above description is only the specific implementations of the present application. However, the scope sought for protection in the present disclosure is not limited thereto. Any modification or replacement within the technical scope disclosed in the present disclosure easily conceived by those skilled in the art should be considered as falling into the protection scope of the present disclosure. Therefore, the scope sought for protection in the present disclosure should be subject to the scope sought for protection in the Claims.

The invention claimed is:

1. A transferring control method applicable to a first electronic device, comprising:
   connecting to a server by a predetermined account;
   sending to the server a transferring request for requesting the server to perform a transferring configuration, wherein the transferring configuration is set by the server by acquiring position information of a plurality of electronic devices connected to the server by the predetermined account acrd determining a message transferring relationship among a plurality of electronic devices based on the position information, and the plurality of electronic devices comprise the first electronic device and at least one second electronic device;
   receiving transferring configuration information from the server; and,
   directly transferring a message between the first electronic device and the at least one second electronic, device, wherein the transferring a message between the first electronic device and the at least one second electronic device comprises:
      receiving transferring configuration information from the server, wherein the transferring configuration information comprises an identifier of the second electronic device used as a receiving device and the transferring configuration information indicates a type of message to be transferred;
      performing transferring configuration on the first electronic device according to the transferring configuration information; and
      transferring a message received by the first electronic device to the receiving device; wherein the message is the type indicated by the transferring configuration information.

2. The transferring control method according to claim 1, wherein there are at least two second electronic devices, and the transferring configuration is used to set a message transferring relationship among the at least two second electronic, devices.

3. The transferring control method according to claim 1, wherein the transferring a message received by the first electronic device to the second electronic device comprises:
   acquiring contact information related to a sending device of a communication message from a contact list of the first electronic device when the first electronic device receives the communication message; and
   delivering the communication message and the contact information to the second electronic device.

4. The transferring control method according to claim 1, wherein the first electronic device comprises a positioning unit, and the transferring control method further comprises:
   determining position information of the first electronic device by using the positioning unit; and
   delivering the position information to the server.

5. A transferring configuration method applicable to a server, comprising:
   determining a message transferring relationship among at least two electronic devices, the at least two electronic devices being connected to the server by a predetermined account; and
   configuring the at least two electronic devices according to the message transferring relationship, so that a transferring device of the at least two electronic devices transfers a message to a receiving device of the at least two electronic devices according to the message transferring relationship,
   wherein the determining a message transferring relationship among at least two electronic devices comprises:
      acquiring position information of the at least two electronic devices; and
      determining a message transferring relationship among the at least two electronic devices based on the position information,
   wherein the configuring the at least two electronic devices according to the message transferring relationship comprises:
      sending transferring configuration information to the transferring device, wherein the transferring configuration information comprises an identifier of the receiving device and the transferring configuration information indicates type of message to be transferred, so that the transferring device performs transferring configuration on the transferring device according to the transferring configuration information, and transfers a message received by the transferring device to the receiving device directly, wherein the message has the type indicated by the transferring configuration information.

6. The transferring configuration method according to claim 5, wherein the determining a message transferring relationship among at least two electronic devices comprises:
   receiving a transferring request from a first electronic device of the at least two electronic devices; and
   determining the message transferring relationship among at least two electronic devices based on the transferring request.

7. The transferring configuration method according to claim 6, wherein the receiving a transferring request from a first electronic device of the at least two electronic devices comprises receiving from the first electronic device a transferring request for determining a message transferring relationship between a second electronic device and a third electronic device, wherein the second electronic device and the third electronic device are electronic devices of the at least two electronic devices being different from the first electronic device.

8. A transferring control apparatus applicable to a first electronic device, comprising:
   a processor;
   a storage unit and a computer program instruction stored on the storage unit, which, when executed by the processor, causes the processor to perform the following processes:
      connecting to a server by a predetermined account;
      sending to the server a transferring request for requesting the server to perform transferring configuration, wherein the transferring configuration is set by the server by acquiring position information of a plurality of electronic devices connected to the server by the predetermined account and determining a message transferring relationship among the plurality of electronic devices based on the position information, and the plurality of electronic devices comprise the first electronic device and at least one second electronic device;
      receiving transferring configuration information from the server; and,
      directly transferring a message between the first electronic device and the at least one second electronic, device, wherein the directly transferring a message between the first electronic device and the at least one second electronic device comprises:
  receiving transferring configuration information from the server, wherein the transferring configuration information comprises an identifier of the second electronic device used as a receiving device and the transferring configuration information indicates a type of message to be transferred;
  performing transferring configuration on the first electronic device according to the transferring configuration information; and
  transferring a message received by the first electronic device to the receiving device, wherein the message is the type indicated by the transferring configuration information.

9. The transferring control apparatus according to claim 8, wherein the at least one second electronic device is at least two second electronic devices, and the transferring configuration is used to set a message transferring relationship among at least two second electronic devices.

10. The transferring control apparatus according to claim 8, wherein the step of transferring a message received by the first electronic device to the second electronic device comprises acquiring contact information related to a sending device of a communication message from a contact list of the first electronic device when the first electronic device receives the communication message, and delivering the communication message and the contact information to the second electronic device.

11. The transferring control apparatus according to claim 8, further comprising:
  determining position information of the first electronic device; and
  delivering the position information to the server.

12. A transferring configuration apparatus applicable to a server, comprising:
  a processor;
  a storage unit and a computer instruction stored on the storage unit which, when executed by the processor, causes the processor to perform the following processes:
    determining a message transferring relationship among at least two electronic devices, the at least two electronic devices being connected to the server by a predetermined account; and
    configuring the at least two electronic devices according to the message transferring relationship, so that transferring device of the at least two electronic devices directly transfers a message to a receiving device of the at least two electronic devices according to the message transferring relationship,
  wherein the determining a message transferring relationship among at least two electronic devices comprises:
    acquiring position information of the at least two electronic devices; and
    determining the message transferring relationship among the at least two electronic devices based on the position information,
  wherein the configuring the at least two electronic devices according to the message transferring relationship comprises:
    sending transferring configuration information to the transferring device, wherein the transferring configuration information comprises an identifier of the receiving device and the transferring configuration information indicates type of message to be transferred, so that the transferring device performs transferring configuration on the transferring device according to the transferring configuration information, and transfers a message received by the transferring device to the receiving device directly, wherein, the message has the type indicated by the transferring configuration information.

13. The transferring configuration apparatus according to claim 12, wherein the determining a message transferring relationship among at least two electronic devices comprises:
  receiving a transferring request from the first electronic device of the at least two electronic devices; and
  determining the message transferring relationship among at least two electronic devices based on the transferring request.

14. The transferring configuration apparatus according to claim 13, wherein the receiving a transferring request from a first electronic device of the at least two electronic devices comprises receiving from the first electronic device a transferring request for determining the message transferring relationship between a second electronic device and a third electronic device, wherein the second electronic device and the third electronic device are electronic devices of the at least two electronic devices being different from the first electronic device.

* * * * *